United States Patent [19]

Long, Jr.

[11] Patent Number: 4,530,504

[45] Date of Patent: Jul. 23, 1985

[54] STABILIZER FOR MANUAL VIDEO GAME CONTROLLER

[76] Inventor: Charles A. Long, Jr., c/o 801 Fifth Ave. North, Birmingham, Ala. 35203

[21] Appl. No.: 496,144

[22] Filed: May 19, 1983

[51] Int. Cl.³ .................. A63F 9/22; A47G 29/00
[52] U.S. Cl. .................. 273/148 B; 248/346; 248/DIG. 10
[58] Field of Search .......... 273/148 R, 148 B, 309, 273/DIG. 28; 248/DIG. 10, 346, 362, 359, 310

[56] References Cited

U.S. PATENT DOCUMENTS

| | | | |
|---|---|---|---|
| 168,673 | 10/1875 | Rosenfeld | 248/154 |
| D. 273,165 | 3/1984 | Sternberg | D6/188 |
| 1,051,107 | 1/1913 | Hedrick | 248/146 |
| 1,088,579 | 2/1914 | Hostetter | 248/146 |
| 1,572,444 | 2/1926 | Mueller | 248/146 |
| 1,762,805 | 6/1930 | Tucker | 248/149 |
| 2,297,193 | 9/1942 | Silverman | 248/146 |
| 2,574,270 | 11/1951 | Leonard | 248/146 |
| 2,746,702 | 5/1956 | Gourley et al. | 248/105 |
| 2,784,577 | 3/1957 | Beaham, III | 248/DIG. 10 |
| 2,905,414 | 9/1959 | Zierden | 248/146 |
| 3,147,734 | 9/1964 | Knapp | 248/310 X |
| 3,415,475 | 12/1968 | Goodman | 248/DIG. 10 X |
| 3,428,281 | 2/1969 | Karp | 248/146 |
| 3,679,161 | 7/1972 | Husting | 248/154 |
| 3,733,042 | 5/1973 | Jungjohann et al. | 248/181 |
| 3,849,857 | 11/1974 | Murray, Jr. | 29/200 P |
| 4,031,663 | 6/1977 | Brunk | 47/66 |
| 4,422,640 | 12/1983 | Tamarkin | 273/148 B |

FOREIGN PATENT DOCUMENTS 1295174 10/1962 France .

OTHER PUBLICATIONS

"First Base" Compute! Magazine, p. 75, Jul. 1983.
"Stick Stand" Box for Commercial Product Submitted by Applicant, Aug. 31, 1983.

Primary Examiner—Richard C. Pinkham
Assistant Examiner—Scott Brown
Attorney, Agent, or Firm—Panitch Schwarze Jacobs & Nadel

[57] ABSTRACT

A manual video game controller having a joy stick or equivalent is stabilized by a surrounding structure which supports the same. The transverse dimensions of the stabilizer are substantially greater than the height thereof. Filler material is inserted into the stabilizer shell to add weight to the stabilizer. Flowable hardenable glue is also inserted to compensate for shrinkage of the fill material and plug the fill hole in the stabilizer shell.

1 Claim, 5 Drawing Figures

STABILIZER FOR MANUAL VIDEO GAME CONTROLLER

BACKGROUND OF THE INVENTION

Manual controllers for operation of video games at home or in arcades are known. Such controllers are quite small and include a portable body which is rectangular in section and having peripheral dimensions of about $3\frac{1}{2}$ inches on a side. The body supports an upstanding joy stick or equivalent having a vertical height of about 3 inches. A bellows type joint couples the joy stick to the body. The controller is connected to an electrical conduit to a control box or the like.

Such manual controllers are very lightweight and use thereof results in extreme operator fatigue because stability can only be acheived through the operator manually holding the controller body with one hand and operating the joy stick with the other hand.

The present invention is based on the recognition of the problem whereby the controller lacks weight and stabilization and presents a solution to that problem which is simple, economical and reliable.

SUMMARY OF THE INVENTION

The apparatus of the present invention is directed to a manual controller for an electrical or electronic device. The controller includes a body circumscribed by a weighted stabilizer with means for securing the stabilizer to the controller body. The weighted stabilizer supports the controller body in a non-rotatable manner. The transverse dimensions of the stabilizer are substantially greater than the height of the stabilizer. An electrical conductor has one end electrically coupled to the controller.

It is an object of the present invention to provide a novel stabilizer for a manual video game controller in a manner which is simple, inexpensive and reliable.

Other objects and advantages will be set forth hereinafter.

For the purpose of illustrating the invention, there is shown in the drawings a form which is presently preferred; it being understood, however, that this invention is not limited to the precise arrangements and instrumentalities shown.

DETAILED DESCRIPTION

Figure 1:
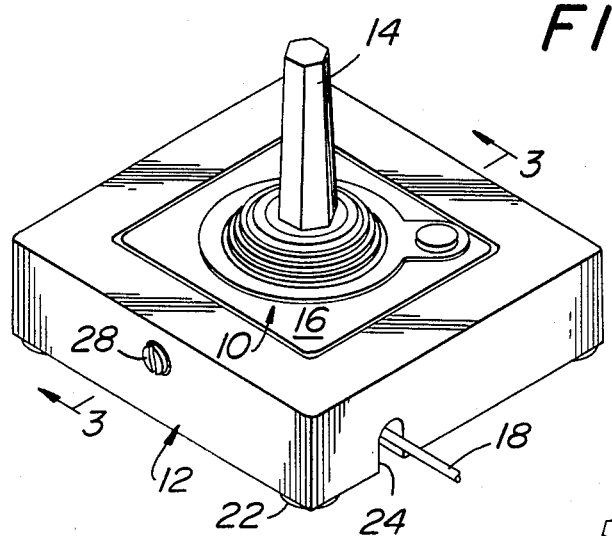
FIG. 1 is a perspective view of a controller and stabilizer of the present invention.

Referring to the drawings in detail, wherein like numerals indicate like elements, there is shown in FIG. 1 a controller designated generally as 10. The controller 10 includes an upstanding joy stick 14 connected to a body 16 by a bellows type joint. The controller 10 also includes a push button for controlling certain video game functions. The controller 10 per se is conventional and has a weight of about $6\frac{1}{2}$ ounces. Because of its light weight and small size, the controller 10 is easily overturned when being used.

In FIG. 1, the controller 10 is provided with a stabilizer 12. Stabilizer 12 is an annular body circumscribing the controller body 16 and non-rotatably supporting the entire controller 10. In order to support the controller 10, the stabilizer 12 has a central opening 20 which in the present embodiment tapers in a direction from its top surface toward its bottom surface. The stabilizer opening 20 at its upper end has transverse dimensions of approximately $3\frac{1}{2}$ to $3\frac{3}{4}$ inches to correspond to the periphery of the controller body 16. The dimensions of the tapered lower end of the stabilizer opening 20 are approximately $3\frac{1}{4}$ inches to $3\frac{1}{2}$ inches.

Figure 2:
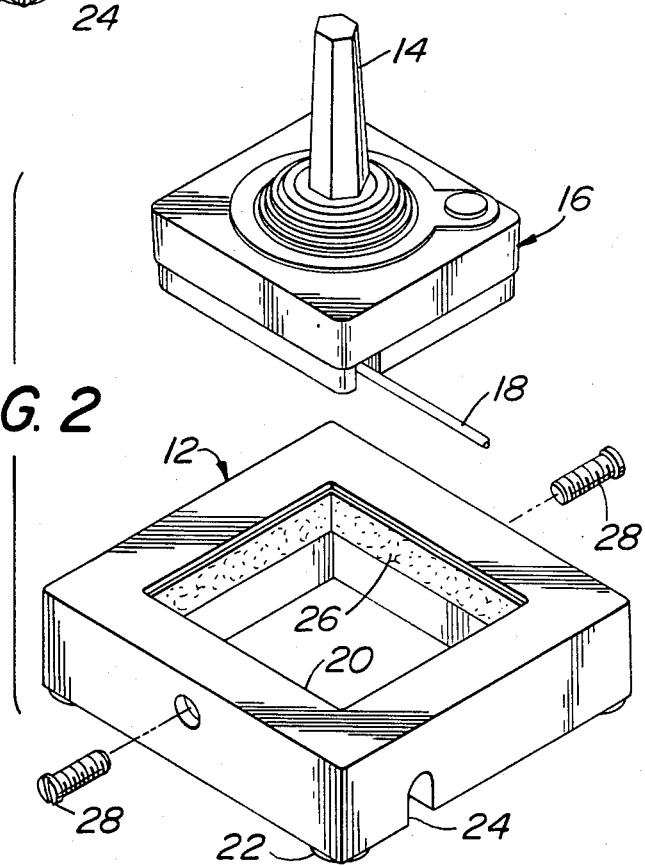
FIG. 2 is an exploded view of the apparatus shown in FIG. 1.
Figure 3:
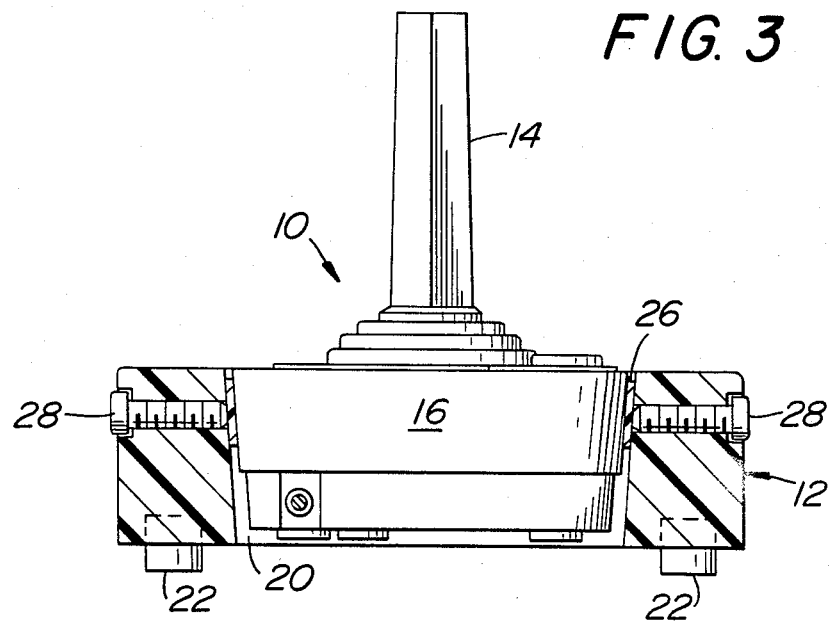
FIG. 3 is a sectional view taken along the line 3—3 in FIG. 1.

As shown in FIG. 3, the stabilizer 12 has support members 22 adjacent its corners and spaced from one another by a distance substantially greater than the transverse dimensions of the controller body 16. The sides of the stabilizer 12 are approximately $5\frac{1}{2}$ to $5\frac{7}{8}$ inches long and have a height of about $1\frac{3}{4}$ inches whereby the controller body 16 will be spaced from the surface supporting the stabilizer 12. The stabilizer 12 also has a transverse passage 24 (shown in FIGS. 1 and 2) through which extends an electrical conductor 18. Conductor 18 has one end connected to electrical circuitry (not shown) within the controller body 16. At its other end which is not shown, the conductor 18 includes a suitable connector for coupling the controller 10 to a video game control box or the like (not shown).

If desired, a portion of the surface of the stabilizer opening 20 may be provided with a liner 26 comprised of rubber, plastic or the like so as to provide substantial friction between the stabilizer 12 and the controller body 16. Liner 26 may be secured in the opening 20 in any convenient manner such as by the use of adhesives. If desired, set screws 28 or other such movable attachment means may extend through diametrically opposite sides of the stabilizer 12 and terminate at the liner 26. The set screws 28 will insure that the controller 10 will be secured or locked in its desired position within the stabilizer 12 as shown.

The stabilizer 12 should have a weight substantially greater than the weight of the controller 10. Stabilizer 12 may be made from a wide variety of materials to provide the necessary stabilizing function. For example, stabilizer 12 may be made from materials such as rubber or from metals, or from plastic to which lead or other suitable weight has been added.

Figure 5:
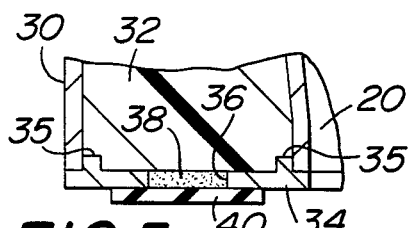
FIG. 5 is an enlarged view of a portion of the apparatus shown in FIG. 4.
Figure 4:
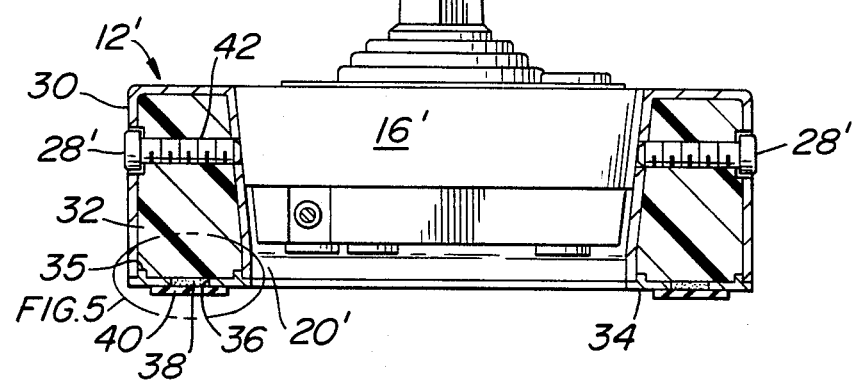
FIG. 4 is a sectional view similar to FIG. 3 but with respect to another embodiment of the present invention.

In FIGS. 4 and 5 there is illustrated another embodiment of the present invention which is substantially the same as that described above. The embodiment in FIGS. 4 and 5 differs in the construction of the stabilizer. Thus, the stabilizer in FIGS. 4 and 5 is designated 12' and corresponding elements of the controllers are designated with corresponding primed numerals.

The stabilizer 12' is identical to the stabilizer 12 (of FIGS. 1-3) except as will be made clear hereinafter. The stabilizer 12' includes an upper metal shell 30, a metal base member 34 and an inner filler 32. The shell 30 and the base member 34 may be made of other suitable materials including plastic. Filler 32 may be plastic, cement, rubber, sand, etc. The base member 34 is provided with suitable line-up guide means in the form of raised tracks 35 which extend around the upper surface as shown. The tracks 35 cooperate with the inner surfaces of the shell 30 as shown in order to facilitate proper alignment when the shell 30 and the base member 34 are assembled together.

When the shell 30 and base member 34 are assembled together, the filler 32 is inserted through fill holes 36 extending through the base member 34 proximate each of the four corners (only two such fill holes are shown). After the filler 32 has been inserted, the fill holes 36 are plugged utilizing glue 38 or any other suitable material which will help tighten the filler 32 to the shell 30 and the base member 34 and will help compensate for any filler shrinkage which may have occured. Thereafter, suitable support members or base pads 40 comprised of rubber, plastic or any other suitable material are affixed to the bottom of the base member 34 to cover the plugged fill holes 36 as shown. The base pads 40 also help prevent the stabilizer 12' from scratching any surface on which the stabilizer is placed and may provide friction to minimize the movement of the stabilizer during play. Suitable openings 42 may be drilled through the shell 30 and the filler 32 to permit the installation of set screws 28 to help retain the stabilizer 12' in position.

In each embodiment of the present invention, the lower end of the stabilizer opening 20 and 20' is accessible for applying pressure to the bottom wall of the controller body 16 when separating the controller body 16 from the stabilizer. Each stabilizer 12, 12' preferably has a weight of about 2 pounds so as to have a weight of twice the weight of the controller 10.

The present invention may be embodied in other specific forms without departing from the spirit or essential attributes thereof and, accordingly, reference should be made to the appended claims, rather than to the foregoing specification, as indicating the scope of the invention.

I claim:

1. Apparatus comprising a manually operable video game controller including a body, an upstanding joy stick, a weighted stabilizer circumscribing the outer periphery of said controller body and non-rotatably supporting said controller body, the transverse dimensions of said stabilizer being substantially greater than the height of said stabilizer, the stabilizer comprising a shell member, filler material which is inserted into the shell member to add weight to the stabilizer and a base member for containing the filler material within the shell member, the base member including at least one fill hole extending therethrough, a flowable hardenable glue material being inserted into the fill hole after the insertion of the filler material to compensate for any shrinkage of the filler material, to secure the filler material to the base member and to plug the fill hole, a support member being affixed to the bottom of the base member by the glue material to cover at least the fill hole and to support the apparatus and prevent damage to a supporting surface, means on said stabilizer for releasably securing said stabilizer to the outer periphery of said controller body, and an electrical conductor having one end electrically coupled to said controller body.

* * * * *